US011702997B2

(12) United States Patent
Thomas et al.

(10) Patent No.: US 11,702,997 B2
(45) Date of Patent: *Jul. 18, 2023

(54) VALVE ASSEMBLY FOR EXHAUST SYSTEM

(71) Applicant: Tenneco Automotive Operating Company Inc., Lake Forest, IL (US)

(72) Inventors: Stephen M. Thomas, Laingsburg, MI (US); Danny D. Alexander, Horton, MI (US)

(73) Assignee: Tenneco Automotive Operating Company Inc., Northville, MI (US)

( * ) Notice: Subject to any disclaimer, the term of this patent is extended or adjusted under 35 U.S.C. 154(b) by 203 days.

This patent is subject to a terminal disclaimer.

(21) Appl. No.: 17/203,045

(22) Filed: Mar. 16, 2021

(65) Prior Publication Data

US 2021/0199057 A1 Jul. 1, 2021

Related U.S. Application Data

(63) Continuation of application No. 16/523,360, filed on Jul. 26, 2019, now Pat. No. 10,961,923.

(51) Int. Cl.
*F02D 9/10* (2006.01)
*F16K 47/02* (2006.01)
(Continued)

(52) U.S. Cl.
CPC ........... *F02D 9/1015* (2013.01); *F01N 1/165* (2013.01); *F02D 9/107* (2013.01); *F02D 9/1065* (2013.01);
(Continued)

(58) Field of Classification Search
CPC ............. Y10T 137/7898; F02D 9/1015; F02D 9/1065; F02D 9/107; F02D 137/1085; F01N 1/165; F16K 47/02; F16K 15/033
See application file for complete search history.

(56) References Cited

U.S. PATENT DOCUMENTS

| 1,337,326 A ‡ | 4/1920 | Rice .................. F02M 1/00 137/527.8 |
| 1,348,562 A ‡ | 8/1920 | Hauser ................ F16K 15/03 137/527.8 |

(Continued)

FOREIGN PATENT DOCUMENTS

| BR | MU8800013 U2 ‡ | 4/2010 |
| CN | 107076322 A | 8/2017 |

(Continued)

OTHER PUBLICATIONS

Written Opinion for PCT/US202020/042709 dated Oct. 27, 2020.‡
International Search Report for PCT/US2020/042709 dated Oct. 27, 2020.‡

*Primary Examiner* — Craig M Schneider
*Assistant Examiner* — Frederick D Soski
(74) *Attorney, Agent, or Firm* — Harness, Dickey & Pierce, P.L.C.

(57) ABSTRACT

A valve assembly for an exhaust system of a vehicle comprises a housing defining an inlet, an outlet, and a longitudinally extending exhaust gas passageway in fluid communication with the inlet and the outlet. The valve assembly further comprises a valve flap disposed in the housing and rotatable between a first position restricting exhaust gas flow through the exhaust gas passageway, and a second position whereat exhaust gas flow through the exhaust gas passageway is less restricted. A mass damper is disposed within the exhaust gas passageway and attached to the valve flap. The mass damper includes end portions and an intermediate portion disposed between the end portions with the intermediate portion having a thickness that is greater than a thickness of the end portions. The mass damper is positioned proximate an inner surface of the housing and positioned between the valve flap and the housing when the valve flap is at the second position.

10 Claims, 9 Drawing Sheets

(51) Int. Cl.
*F01N 1/16* (2006.01)
*F16K 15/03* (2006.01)

(52) U.S. Cl.
CPC ............ *F02D 9/1085* (2013.01); *F16K 47/02* (2013.01); *F16K 15/033* (2013.01); *Y10T 137/7898* (2015.04); *Y10T 137/7901* (2015.04)

(56) References Cited

U.S. PATENT DOCUMENTS

| | | | | |
|---|---|---|---|---|
| 2,925,827 | A ‡ | 2/1960 | Anderson | F16K 15/03 137/527.4 |
| 3,060,961 | A ‡ | 10/1962 | Conley | F16K 15/03 137/527.4 |
| 3,075,547 | A ‡ | 1/1963 | Scaramucci | F16K 15/03 137/516.29 |
| 3,128,785 | A ‡ | 4/1964 | Krummel | E03F 7/04 137/315.33 |
| 3,144,876 | A ‡ | 8/1964 | Frye | F16K 15/03 137/454.5 |
| 3,191,619 | A ‡ | 6/1965 | Allen | F16K 15/03 137/527.4 |
| 3,234,924 | A | 2/1966 | May | |
| 3,498,322 | A ‡ | 3/1970 | Gilliam | F16K 15/033 137/527.2 |
| 3,685,794 | A ‡ | 8/1972 | Henning | F16K 1/2014 251/30 |
| 4,194,722 | A ‡ | 3/1980 | Okerblom | F16K 1/222 251/30 |
| 4,222,356 | A ‡ | 9/1980 | Ueda | F02M 26/58 123/56 |
| 4,411,405 | A ‡ | 10/1983 | Barbe | F16K 1/226 251/30 |
| 4,508,139 | A ‡ | 4/1985 | Teumer | F16K 15/033 137/31 |
| 4,688,472 | A ‡ | 8/1987 | Inglis | F16K 1/222 181/277 |
| 4,698,940 | A ‡ | 10/1987 | Zwicker | B24C 5/02 137/527 |
| 4,699,244 | A | 10/1987 | Bergquist et al. | |
| 5,081,972 | A ‡ | 1/1992 | Daly | F02D 9/1015 123/337 |
| 5,099,877 | A ‡ | 3/1992 | Fluegel | F16K 15/03 137/527 |
| 5,146,949 | A ‡ | 9/1992 | Retzloff | F16K 15/033 137/527 |
| 5,355,673 | A ‡ | 10/1994 | Sterling | F01N 13/082 137/527 |
| 5,698,781 | A ‡ | 12/1997 | Zellering | G01F 1/00 137/527 |
| 5,709,241 | A ‡ | 1/1998 | Iwata | F01N 1/02 137/527 |
| 5,738,087 | A ‡ | 4/1998 | King | A61M 15/0086 128/200.23 |
| 5,855,224 | A ‡ | 1/1999 | Lin | E03B 7/077 137/512 |
| 6,003,490 | A ‡ | 12/1999 | Kihara | F02D 9/1015 123/33 |
| 6,047,950 | A ‡ | 4/2000 | Pontoppidan | F02D 9/10 123/33 |
| 6,237,625 | B1 ‡ | 5/2001 | Randolph | F16K 15/038 137/512.15 |
| 6,247,489 | B1 ‡ | 6/2001 | Maskell | F16K 15/03 137/269.5 |
| 6,648,013 | B1 ‡ | 11/2003 | Ray | F16K 15/033 137/527 |
| 6,668,858 | B1 ‡ | 12/2003 | Bazargan | F16K 15/033 137/269.5 |
| 6,679,290 | B2 ‡ | 1/2004 | Matthews | F16K 15/031 137/527 |
| 6,726,176 | B2 ‡ | 4/2004 | Bauman | F16K 1/222 251/30 |
| 6,736,160 | B2 ‡ | 5/2004 | Nagai | F01N 1/165 137/527 |
| 6,824,119 | B2 ‡ | 11/2004 | Conley | F02D 9/1015 123/33 |
| 6,959,915 | B1 ‡ | 11/2005 | Wald | F16K 1/222 123/33 |
| 7,434,570 | B2 ‡ | 10/2008 | Hill | F01N 1/006 123/568.18 |
| 7,451,854 | B2 ‡ | 11/2008 | Suzuki | F01N 13/02 181/237 |
| 7,748,404 | B2 ‡ | 7/2010 | Abram | F16K 1/2028 137/52 |
| 7,805,933 | B2 ‡ | 10/2010 | Hanitzsch | F02D 9/107 60/324 |
| 7,896,130 | B2 * | 3/2011 | Hill | F01N 1/166 181/254 |
| 8,191,572 | B2 * | 6/2012 | Lefler | F16K 15/03 137/527 |
| 8,317,158 | B2 ‡ | 11/2012 | Patterson | F16K 1/20 251/36 |
| 8,381,401 | B2 | 2/2013 | Sahs et al. | |
| 8,453,672 | B2 * | 6/2013 | Abram | F01N 1/08 251/303 |
| 8,657,065 | B1 ‡ | 2/2014 | Hill | F01N 1/165 181/25 |
| 9,376,947 | B2 * | 6/2016 | Abram | F01N 1/08 |
| 9,388,907 | B2 ‡ | 7/2016 | Gerards | F02D 9/04 |
| 9,464,559 | B2 | 10/2016 | Middleton, Jr. et al. | |
| 9,540,995 | B2 | 1/2017 | Houtschilt et al. | |
| 9,605,581 | B1 ‡ | 3/2017 | Middleton, Jr. | F01N 9/00 |
| 9,850,798 | B1 | 12/2017 | Borla | |
| 9,982,793 | B2 | 5/2018 | Thomas et al. | |
| 9,982,794 | B2 * | 5/2018 | Thomas | F16K 15/033 |
| 10,041,388 | B2 | 8/2018 | Chung | |
| 10,041,389 | B2 ‡ | 8/2018 | Weidner | F02M 26/26 |
| 10,180,092 | B2 | 1/2019 | Geer et al. | |
| 10,253,664 | B2 | 4/2019 | Middleton, Jr. et al. | |
| 10,436,088 | B2 * | 10/2019 | Thomas | F02D 9/1015 |
| 10,788,136 | B1 ‡ | 9/2020 | Thomas | F01N 1/165 |
| 10,961,923 | B2 | 3/2021 | Thomas et al. | |
| 11,041,459 | B2 | 6/2021 | Kunkel et al. | |
| 11,054,846 | B2 * | 7/2021 | Ashton | F24F 11/75 |
| 11,105,425 | B2 * | 8/2021 | Feng | F16K 15/03 |
| 11,149,602 | B2 * | 10/2021 | Berger | F01N 1/166 |
| 11,274,581 | B2 | 3/2022 | Thomas et al. | |
| 11,293,558 | B2 * | 4/2022 | Claes | F04C 29/126 |
| 11,549,415 | B2 * | 1/2023 | Oh | F01N 13/1844 |
| 2007/0235088 | A1 ‡ | 10/2007 | Klein | F16K 15/038 137/512.15 |
| 2008/0236680 | A1 ‡ | 10/2008 | Abram | F02D 9/103 137/527 |
| 2008/0237521 | A1 ‡ | 10/2008 | Abram | F02D 9/04 251/213 |
| 2009/0116938 | A1 ‡ | 5/2009 | Wakabayashi | F16K 15/03 414/217.1 |
| 2009/0126356 | A1 ‡ | 5/2009 | Abram | F01N 1/02 60/324 |
| 2009/0126359 | A1 * | 5/2009 | Abram | F02D 9/04 181/212 |
| 2010/0192559 | A1 ‡ | 8/2010 | Abram | F02D 9/1015 60/324 |
| 2010/0192560 | A1 ‡ | 8/2010 | Abram | F01N 13/085 60/324 |
| 2010/0263211 | A1 ‡ | 10/2010 | Sahs | F16K 27/0218 29/890.131 |
| 2010/0263743 | A1 ‡ | 10/2010 | Lefler | F02D 9/1025 137/527 |
| 2010/0294589 | A1 ‡ | 11/2010 | Hill | F01N 1/166 181/236 |
| 2010/0313554 | A1 ‡ | 12/2010 | Abram | F01N 1/165 60/324 |
| 2010/0326544 | A1 ‡ | 12/2010 | Elwart | F16K 17/363 137/527 |
| 2011/0061751 | A1 ‡ | 3/2011 | Jumpol | F16K 27/0227 137/527 |
| 2011/0290349 | A1 ‡ | 12/2011 | Cozens | E03F 7/04 137/527.6 |

(56) References Cited

U.S. PATENT DOCUMENTS

| | | | | |
|---|---|---|---|---|
| 2013/0056083 A1‡ | 3/2013 | Abram | ............ | F02D 9/04 |
| | | | | 137/2 |
| 2013/0232961 A1‡ | 9/2013 | Abram | ............ | F16K 17/0433 |
| | | | | 60/324 |
| 2013/0233269 A1‡ | 9/2013 | Houtschilt | ............ | F02B 77/00 |
| | | | | 123/188.1 |
| 2013/0299004 A1‡ | 11/2013 | Abram | ............ | F01N 1/16 |
| | | | | 137/15.25 |
| 2013/0333502 A1‡ | 12/2013 | Barton | ............ | F16K 1/2014 |
| | | | | 74/405 |
| 2013/0333784 A1‡ | 12/2013 | Marak | ............ | F16K 15/033 |
| | | | | 137/601.17 |
| 2014/0053923 A1‡ | 2/2014 | Martinelli | ............ | F16K 15/03 |
| | | | | 137/527.8 |
| 2014/0246617 A1‡ | 9/2014 | Diel | ............ | F16K 1/22 |
| | | | | 251/305 |
| 2015/0152760 A1‡ | 6/2015 | Kainuma | ............ | F01N 1/24 |
| | | | | 181/226 |
| 2016/0032794 A1‡ | 2/2016 | Fischer | ............ | F02D 9/04 |
| | | | | 251/305 |
| 2016/0222863 A1‡ | 8/2016 | Middleton, Jr. | ............ | F16K 1/22 |
| 2017/0107875 A1‡ | 4/2017 | Chung | ............ | F01N 1/166 |
| 2017/0198823 A1‡ | 7/2017 | Abouelleil | ............ | F16K 15/031 |
| 2017/0204756 A1‡ | 7/2017 | Middleton, Jr. | ............ | F01N 13/08 |
| 2018/0003097 A1‡ | 1/2018 | Godard | ............ | F01N 5/02 |
| 2018/0038494 A1‡ | 2/2018 | Thomas | ............ | F16K 15/033 |
| 2018/0038495 A1‡ | 2/2018 | Thomas | ............ | B23P 15/002 |
| 2018/0051607 A1‡ | 2/2018 | Geer | ............ | F01N 1/08 |
| 2018/0051609 A1‡ | 2/2018 | Geer | ............ | F01N 13/08 |
| 2018/0051610 A1‡ | 2/2018 | Thomas | ............ | F16K 1/2261 |
| 2018/0112780 A1‡ | 4/2018 | Rain | ............ | F16K 1/2071 |
| 2018/0326837 A1‡ | 11/2018 | Bell | ............ | B60K 13/06 |
| 2018/0355985 A1‡ | 12/2018 | Reszewicz | ............ | F16K 15/038 |
| 2018/0356001 A1‡ | 12/2018 | Milroy | ............ | F16K 15/181 |
| 2019/0170092 A1‡ | 6/2019 | Oblinger | ............ | F16K 31/043 |
| 2020/0011219 A1‡ | 1/2020 | Oh | ............ | F01N 1/163 |
| 2021/0222783 A1* | 7/2021 | Okuno | ............ | F16K 15/148 |
| 2021/0381444 A1* | 12/2021 | Hatsuzawa | ............ | F02D 9/1065 |

FOREIGN PATENT DOCUMENTS

| | | | |
|---|---|---|---|
| CN | 107120153 A | ‡ | 9/2017 |
| CN | 207620874 U | ‡ | 7/2018 |
| CN | 109340386 A | ‡ | 2/2019 |
| DE | 3707904 A1 | ‡ | 9/1988 |
| DE | 102009049614 A1 | ‡ | 4/2011 |
| EP | 2816264 B1 | ‡ | 3/2016 |
| EP | 2881634 B1 | ‡ | 3/2017 |
| JP | H07119498 A | ‡ | 5/1995 |
| JP | 3029656 U | ‡ | 10/1996 |
| JP | 2007-192087 A | ‡ | 8/2007 |
| KR | 101237930 B1 | | 2/2013 |

\* cited by examiner

‡ imported from a related application

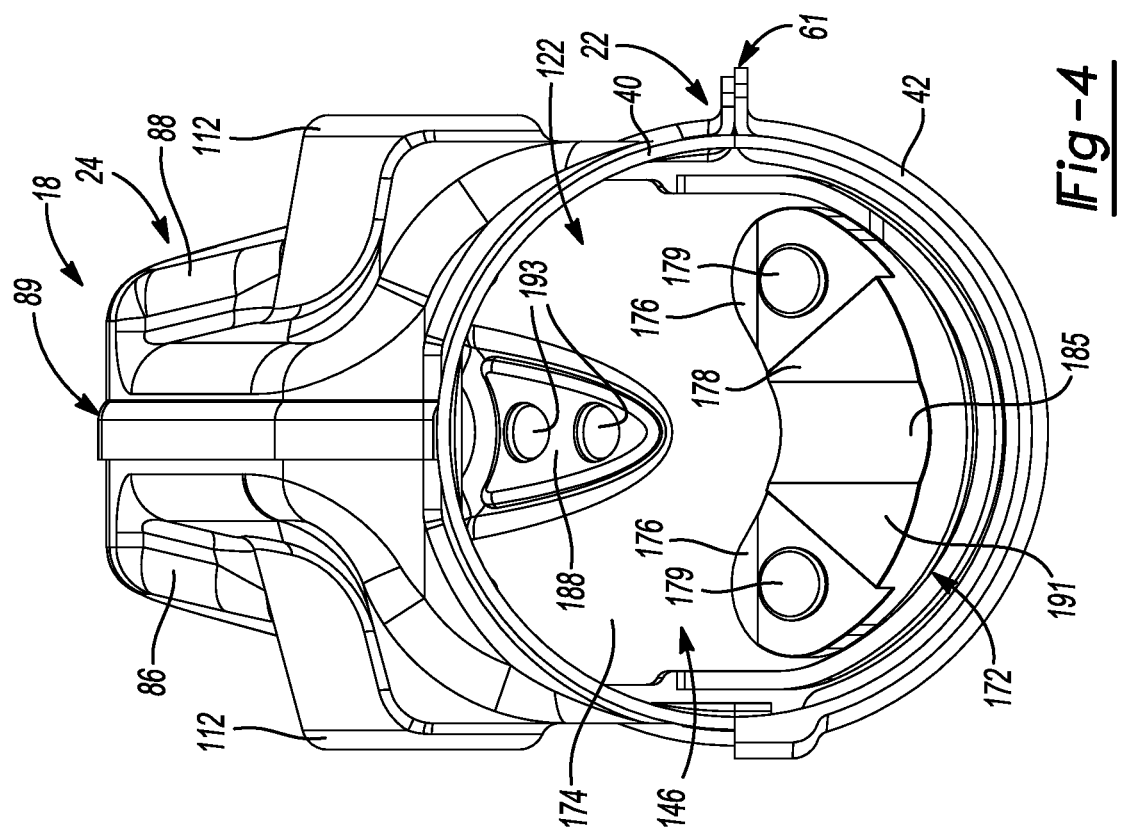
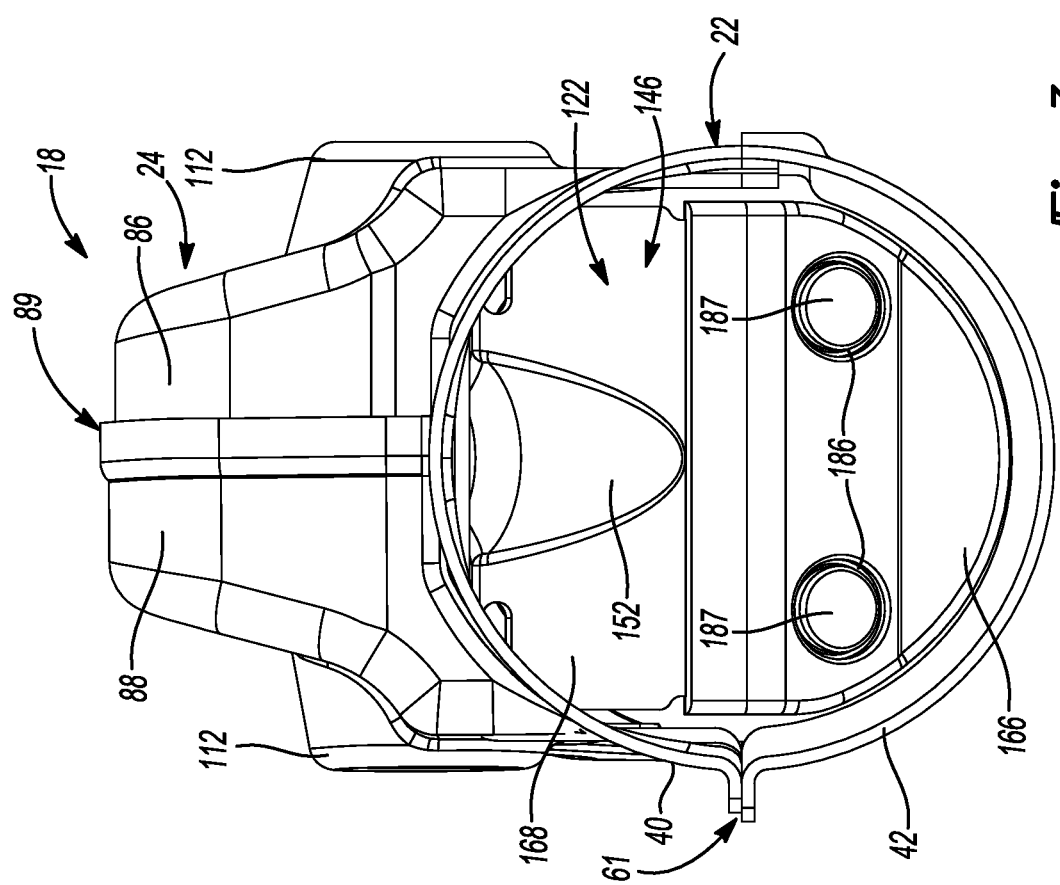

VALVE ASSEMBLY FOR EXHAUST SYSTEM

CROSS-REFERENCE TO RELATED APPLICATIONS

The present disclosure is a continuation of U.S. patent application Ser. No. 16/523,360 filed on Jul. 26, 2019. The entire disclosure of the application referenced above is incorporated herein by reference.

FIELD

The present disclosure relates to an externally mounted in-line exhaust gas valve.

BACKGROUND

This section provides background information related to the present disclosure and is not necessarily prior art.

Many vehicle exhaust systems use active and/or passive valve assemblies to alter the characteristics of exhaust flow through a conduit as the exhaust pressure increases due to increasing engine speed. Active valves carry the increased expense of requiring a specific actuating element, such as a solenoid. By contrast, passive valves generally include a spring biased valve flap and utilize the pressure of the exhaust flow in the conduit to actuate (i.e., open) the valve. Although passive valves are less expensive, traditional passive valves can be difficult to package and are susceptible to vibration related noise and excessive valve flutter caused by flowrate fluctuations in the engine's exhaust flow (i.e., exhaust pulsation). Such valves can present vibration and noise problems due to resonance of the valve flap and biasing spring. As a result, there remains a need for improved passive valves.

SUMMARY

This section provides a general summary of the disclosure, and is not a comprehensive disclosure of its full scope or all of its features.

In one form, the present disclosure provides a valve assembly for an exhaust system of a vehicle. The valve assembly includes a housing, a valve flap and a mass damper. The housing defines an inlet, an outlet, and a longitudinally extending exhaust gas passageway in fluid communication with the inlet and the outlet. The valve flap is disposed in the housing and is rotatable between a first position restricting exhaust gas flow through the exhaust gas passageway, and a second position whereat exhaust gas flow through the exhaust gas passageway is less restricted. The mass damper is disposed within the exhaust gas passageway. The mass damper is attached to the valve flap and comprise of a material having a high density. The mass damper is shielded from the exhaust gas flowing through the exhaust gas passageway when the valve flap is in the second position.

In some configurations of the valve assembly of the above paragraph, the mass damper includes end portions and an intermediate portion disposed between the end portions. The intermediate portion has a thickness that is thicker than a thickness of the end portions.

In some configurations of the valve assembly of any one or more of the above paragraphs, a fastener extends through an aperture in a respective end portion and an aperture in the valve flap to attach the valve flap and the mass damper to each other.

In some configurations of the valve assembly of any one or more of the above paragraphs, the intermediate portion includes a planar surface having a groove formed therein.

In some configurations of the valve assembly of any one or more of the above paragraphs, the valve assembly further comprising a heat shield attached to the housing. The groove accommodates the heat shield when the valve flap is in the second position so that the mass damper and the heat shield are prevented from contacting each other.

In some configurations of the valve assembly of any one or more of the above paragraphs, the mass damper faces the outlet when the valve flap is in the first position.

In some configurations of the valve assembly of any one or more of the above paragraphs, the mass damper includes a curved periphery aligned with a curved periphery of the valve flap.

In some configurations of the valve assembly of any one or more of the above paragraphs, the mass damper is made of tungsten carbide.

In some configurations of the valve assembly of any one or more of the above paragraphs, the mass damper is formed by a molding process.

In another form, the present disclosure provides a valve assembly for an exhaust system of a vehicle. The valve assembly includes a housing, a heat shield, a valve flap and a first pad. The housing defines an inlet, an outlet, and an exhaust gas passageway in fluid communication with the inlet and the outlet. The heat shield is attached to the housing. The valve flap is disposed in the housing and rotatable between a first position restricting exhaust gas flow through the exhaust gas passageway, and a second position whereat exhaust gas flow through the exhaust gas passageway is less restricted. The first pad is attached to a first surface of the valve flap and contacts the heat shield when the valve flap is in the second position. The first pad is shielded from the exhaust gas flowing through the exhaust gas passageway when the valve flap is in the second position.

In some configurations of the valve assembly of the above paragraph, the valve flap has an indentation formed therein. The first pad is received in a recess formed by the indentation.

In some configurations of the valve assembly of any one or more of the above paragraphs, the first pad and the recess have a triangular-shape.

In some configurations of the valve assembly of any one or more of the above paragraphs, the heat shield is attached to an outside surface of the housing and includes an indentation that extends into the exhaust gas passageway. The first pad is configured to contact the indentation when the valve flap is in the second position to limit rotation of the valve flap.

In some configurations of the valve assembly of any one or more of the above paragraphs, the valve assembly further includes a second pad attached to a second surface of the valve flap that is opposite the first surface. The second pad has a periphery that extends past a periphery of the valve flap and contacts the housing when the valve flap is in the first position.

In some configurations of the valve assembly of any one or more of the above paragraphs, the first pad and the second pad are made of a wire-mesh material.

In some configurations of the valve assembly of any one or more of the above paragraphs, the second pad includes a first portion and a second portion that is movable relative to the first portion. The periphery of the second pad is at the second portion.

In some configurations of the valve assembly of any one or more of the above paragraphs, the second portion is angled relative to the first portion when the valve flap is removed from the first position and is aligned with the first portion when the valve flap is in the first position.

In some configurations of the valve assembly of any one or more of the above paragraphs, the second pad includes a first aperture extending therethrough and a recess formed in a surface and around the first aperture.

In some configurations of the valve assembly of any one or more of the above paragraphs, the valve assembly further includes a fastener extending through the first aperture and a second aperture in the valve flap to attach the valve flap and the second pad to each other. A head of the fastener is disposed in the recess so that the head and the surface of the second pad are flush with each other.

In yet another form, the present disclosure provides a valve assembly for an exhaust system of a vehicle. The valve assembly includes a housing, a heat shield, a valve flap and a first pad, a second pad, a mass damper and a fastener. The housing defines an inlet, an outlet, and an exhaust gas passageway in fluid communication with the inlet and the outlet. The heat shield is attached to the housing. The valve flap is disposed in the housing and rotatable between a first position restricting exhaust gas flow through the exhaust gas passageway, and a second position whereat exhaust gas flow through the exhaust gas passageway is less restricted. The first pad is attached to a first surface of the valve flap and is configured to contact the heat shield when the valve flap is in the second position. The second pad is attached to a second surface of the valve flap that is opposite the first surface. The second pad has a periphery that extends past a periphery of the valve flap and contacts the housing when the valve flap is in the first position. The mass damper is attached to the first surface of the valve flap and made of a material having a high density. The fastener extends through first, second and third apertures in the valve flap, the second pad and the mass damper, respectively, to attach the valve flap, the second pad and the mass damper to each other. The first pad and the mass damper are shielded from the exhaust gas flowing through the exhaust gas passageway when the valve flap is in the second position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a front view of the valve assembly;

FIG. 4 is a back view of the valve assembly;

Corresponding reference numerals indicate corresponding parts throughout the several views of the drawings.

DETAILED DESCRIPTION

Example embodiments will now be described more fully with reference to the accompanying drawings.

Figure 1:
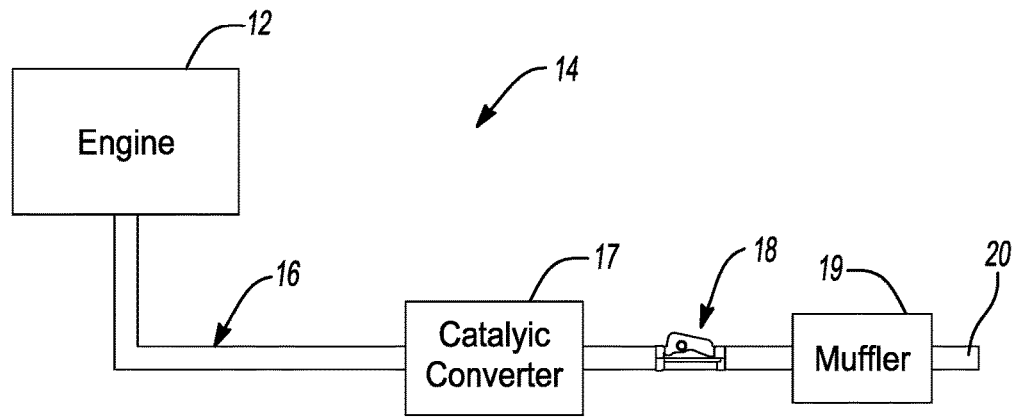
FIG. 1 is a schematic representation of an engine and an exhaust system having a valve assembly according to the principles of the present disclosure.
Figure 2:
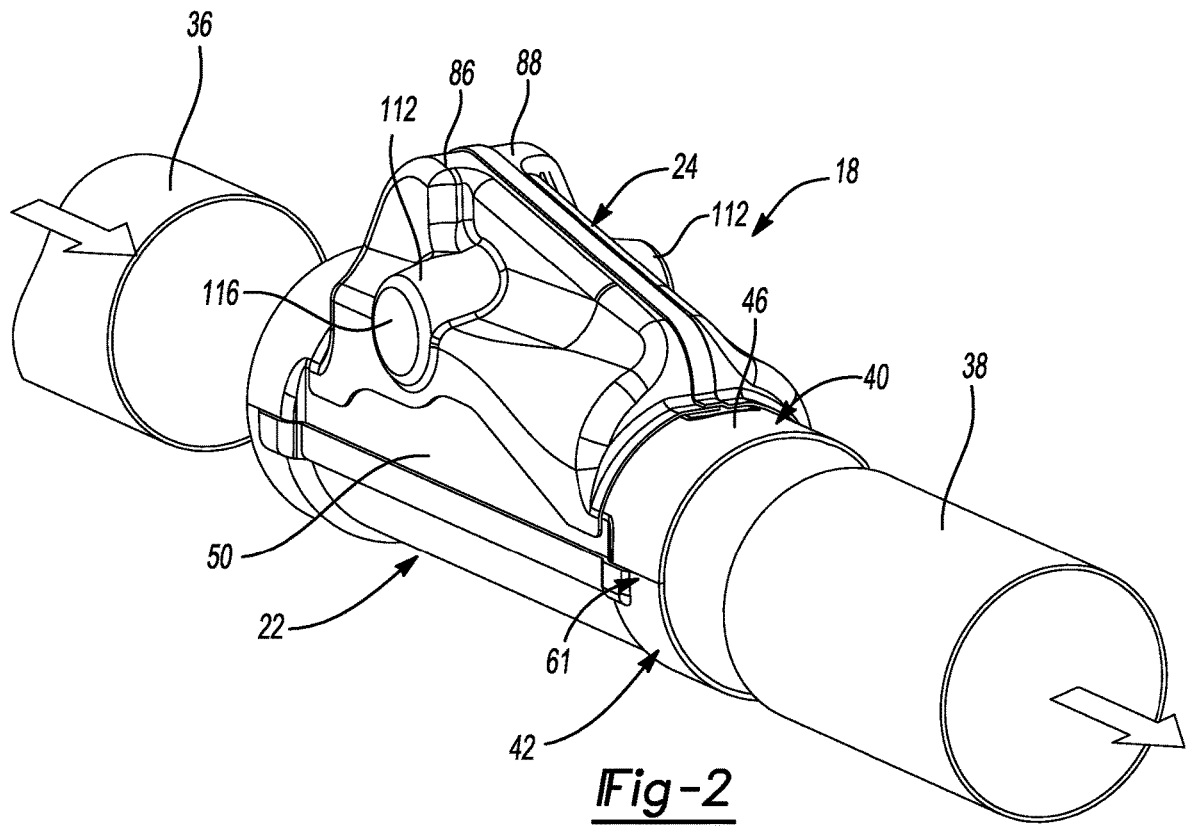
FIG. 2 is a perspective view of the valve assembly of FIG. 1.

As shown in FIG. 1, an engine 12 and an exhaust system 14 are shown schematically. The engine 12 may be an internal combustion engine associated with a vehicle (not shown), for example. Exhaust gas may be discharged from the engine 12 and may subsequently flow through the exhaust system 14. The exhaust system 14 may include an exhaust pipe 16, a catalytic converter 17, a valve assembly 18, a muffler 19 and a tailpipe 20. Exhaust gas discharged from the engine 12 may flow through the exhaust pipe 16, the catalytic converter 17, the valve assembly 18, the muffler 19, and may exit through the tailpipe 20. The valve assembly 18 may be disposed upstream of the muffler 19 (e.g., between the catalytic converter 17 and the muffler 19). In some configurations, the valve assembly 18 may be dispose downstream of the muffler 19.

Figure 5:
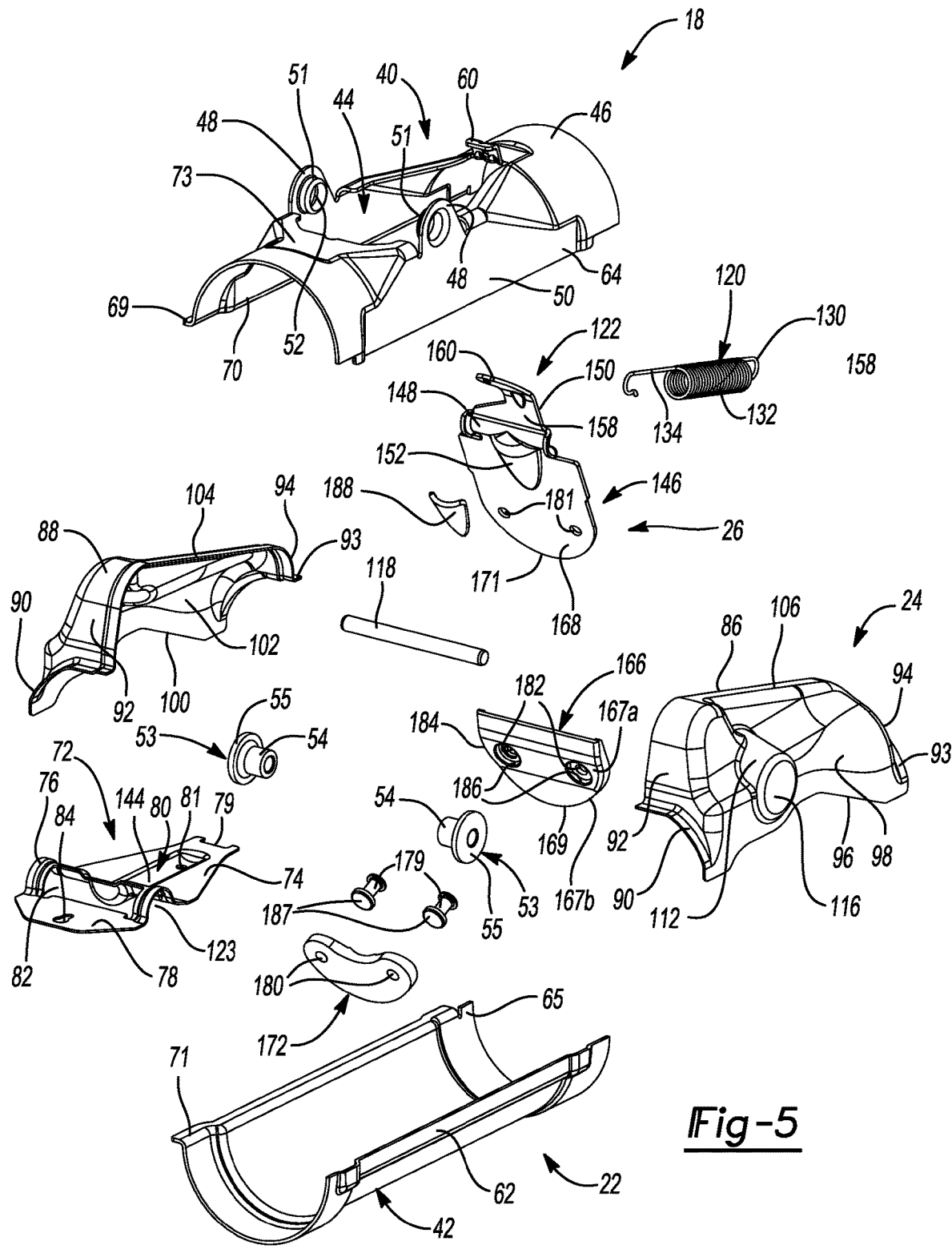
FIG. 5 is an exploded perspective view of the valve assembly.
Figure 6:
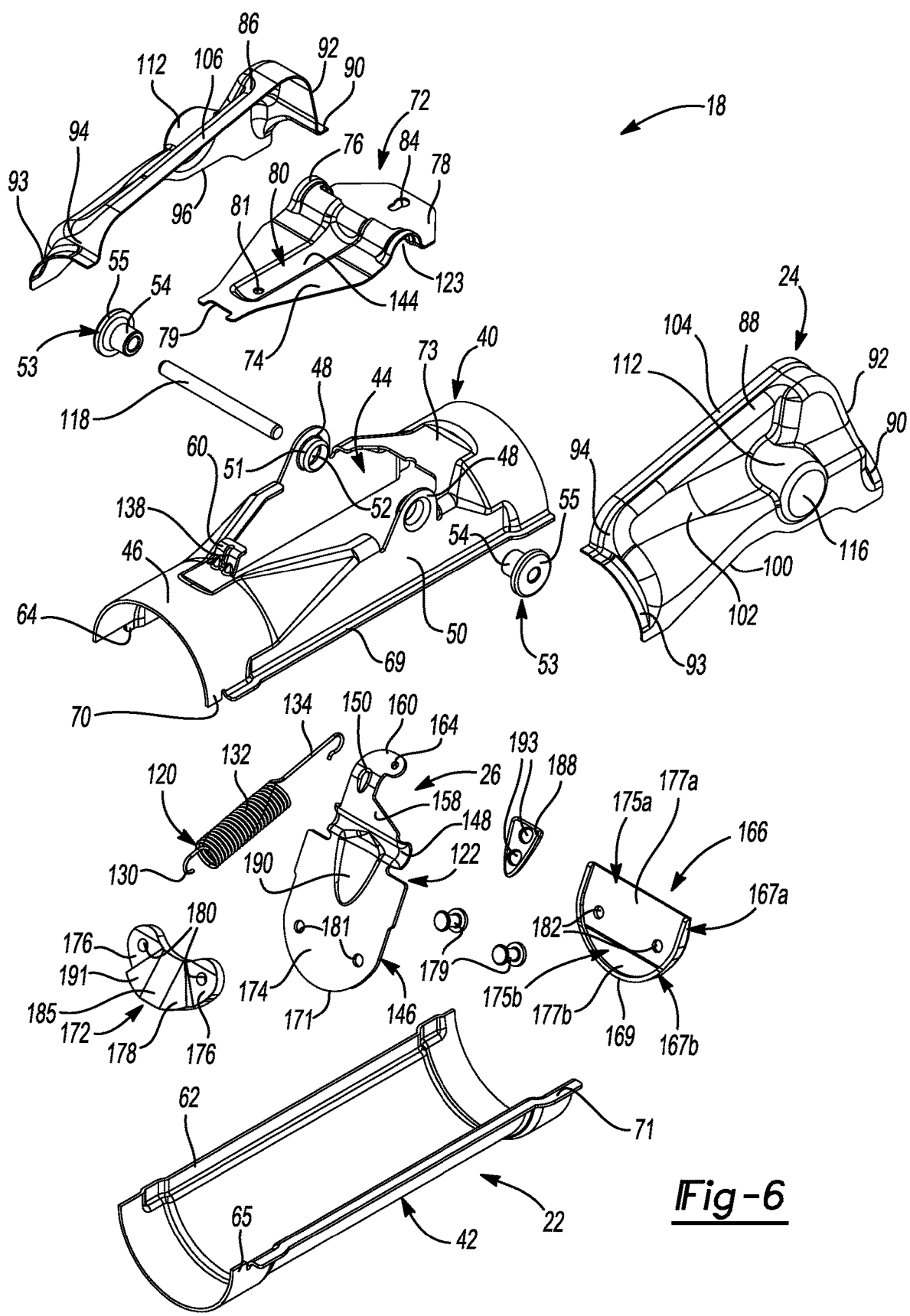
FIG. 6 is another exploded perspective view of the valve assembly.
Figure 7:
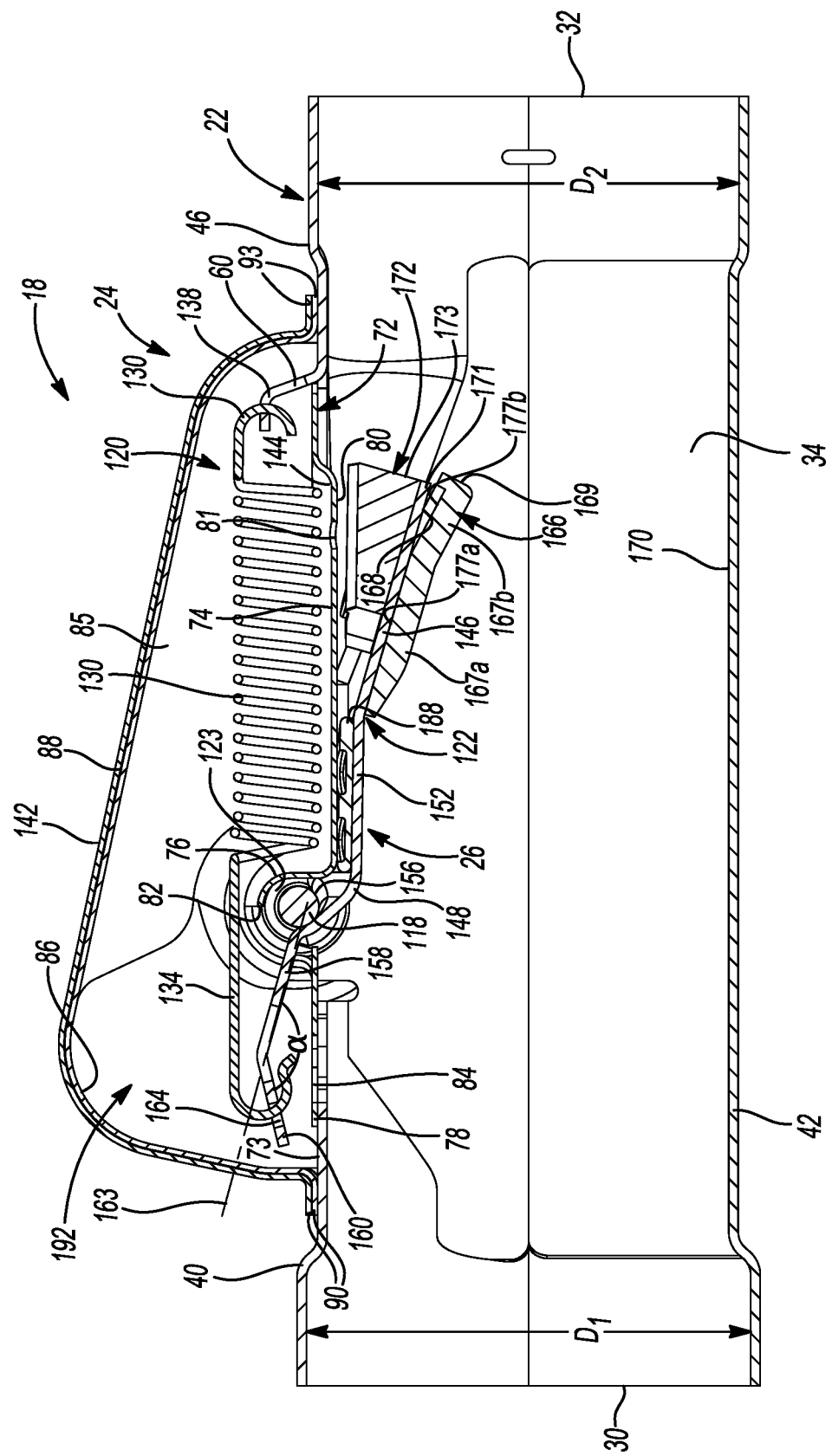
FIG. 7 is a cross-sectional view of the valve assembly with a valve flap assembly in an open position.
Figure 8:
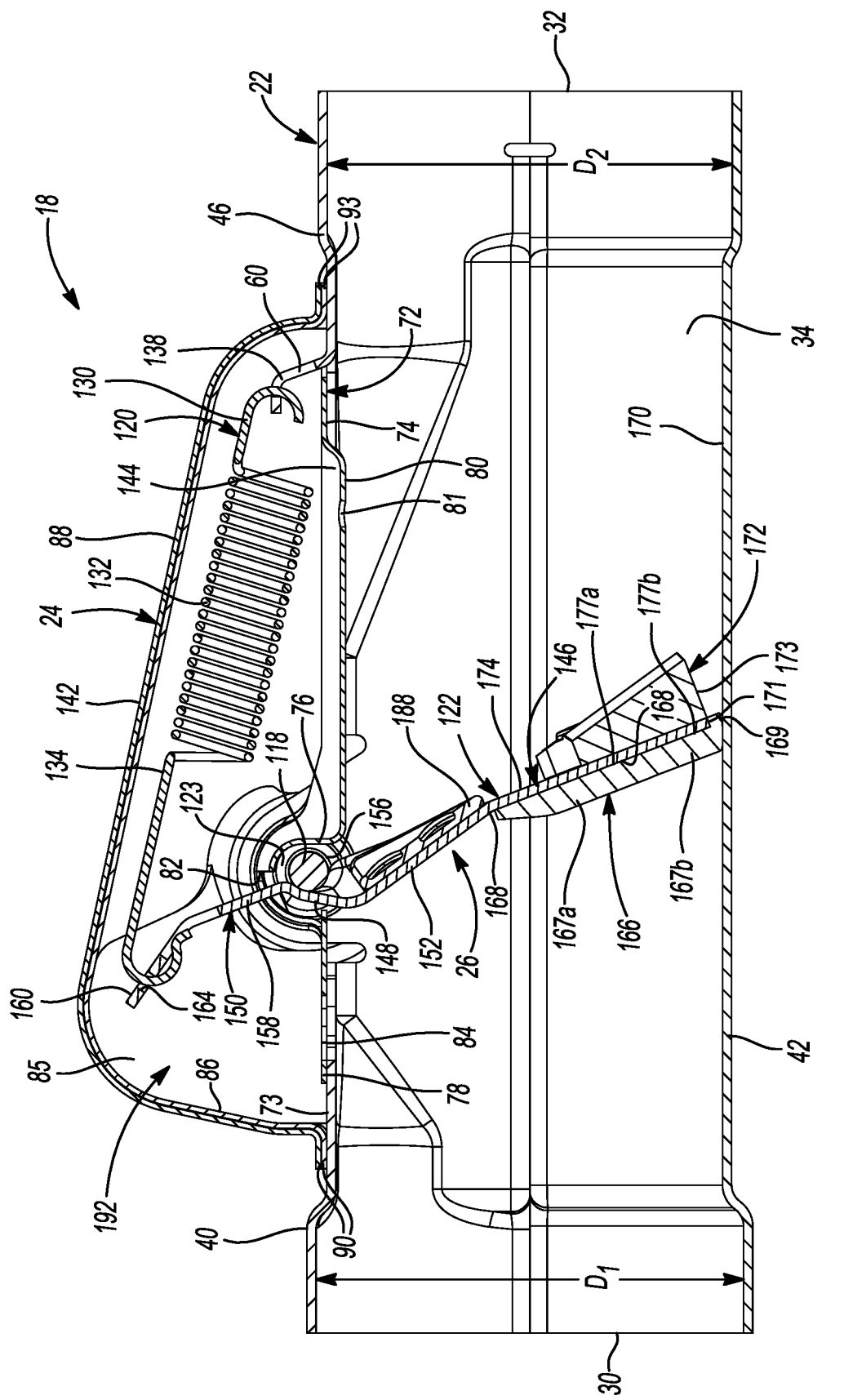
FIG. 8 is a cross-sectional view of the valve assembly with the valve flap assembly in a closed position.

With reference to FIGS. 2-10, the valve assembly 18 may include a first housing assembly 22, a second housing assembly 24 (FIGS. 2-9) and a valve flap assembly 26 (FIGS. 5-9). As shown in FIGS. 7 and 8, the first housing assembly 22 may define an inlet 30, an outlet 32 and a fluid passageway 34 extending in a longitudinal direction of the first housing assembly 22 and between the inlet 30 and the outlet 32. The inlet 30 may have a diameter $D_1$ that is wider than a diameter of an inlet connecting pipe 36 (FIG. 2) attached to the first housing assembly 22 at the inlet 30 so that the exhaust gas flowing from the inlet connecting pipe 36 into the first housing assembly 22 has a smooth flow transition. The outlet 32 may have a diameter $D_2$ that is smaller than a diameter of an outlet connecting pipe 38 (FIG. 2) attached to the first housing assembly 22 at the outlet 32 so that the exhaust gas flowing from the first housing assembly 22 into the outlet connecting pipe 38 has a smooth flow transition. This minimizes noise of the exhaust gas that is generated by turbulence. The diameter $D_1$ of the inlet 30 is also wider than the diameter $D_2$ of the outlet 32.

The first housing assembly 22 may include a monolithic first or upper shell 40 and a second or lower shell 42. In some configurations, the first and second shells 40, 42 may be side shells that are symmetric to each other about plane A. The first and second shells 40, 42 may be formed by a stamping process. The first shell 40 may have a generally semi-circular or "U" cross-sectional shape and may define an opening 44 (FIGS. 5 and 6) at a top side 46 thereof. As shown in FIGS. 5 and 6, opposing sidewalls or ears 48 may be integrally formed with the first shell 40 and may extend upwardly from respective sides 50 of the first shell 40. Each sidewall 48 may include a trunnion 51 that is positioned above and out of the fluid passageway 34. The trunnions 51 may be opposed to each other and may each define an aperture or cavity 52 extending at least partially therethrough.

Figure 9:
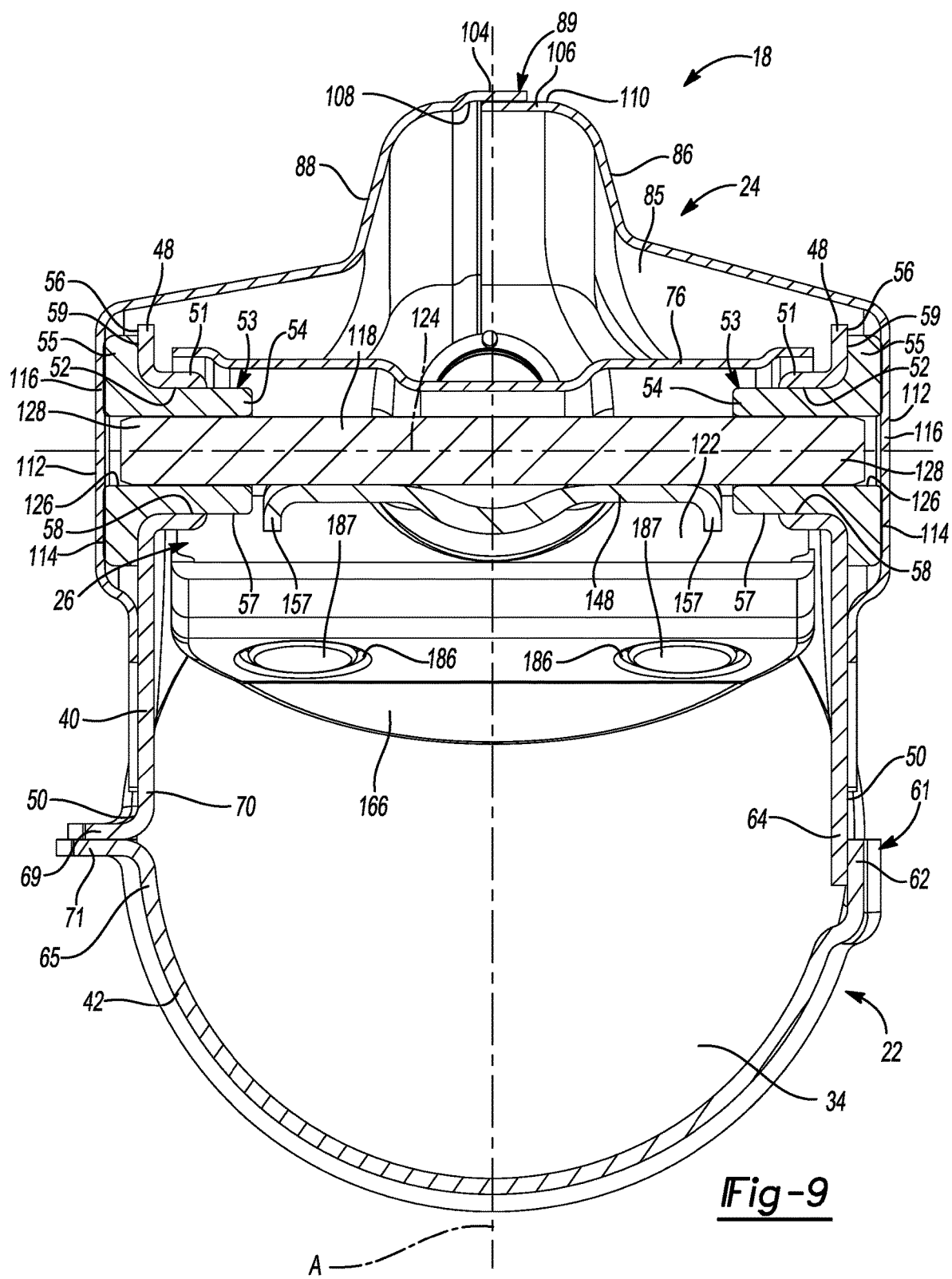
FIG. 9 is another cross-sectional view of the valve assembly with the valve flap assembly in the open position.
Figure 10:
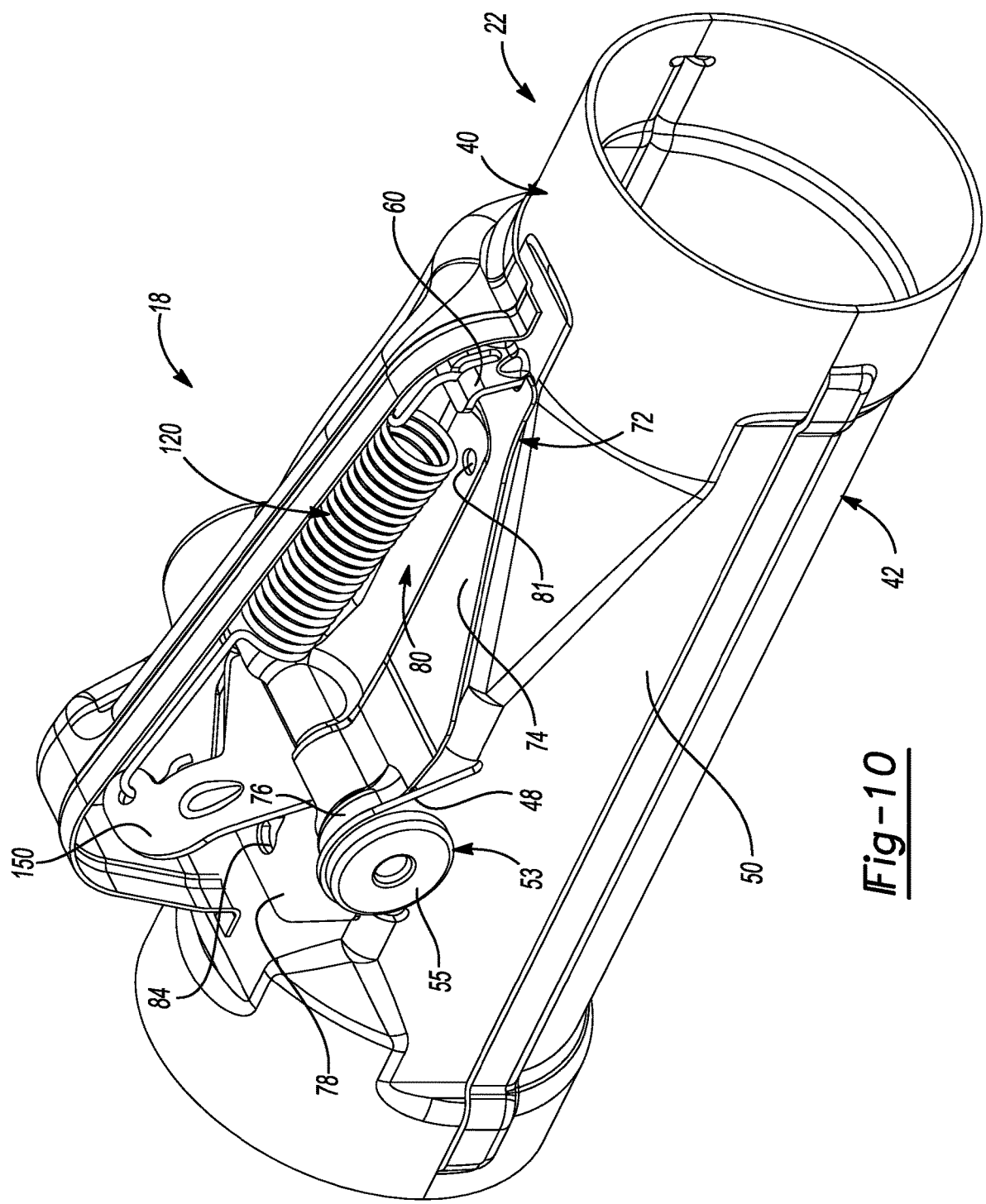
FIG. 10 is a perspective view of the valve assembly with a portion of a second housing cutaway.

A bushing 53 may be made of a metallic material and may be press-fit into a respective trunnion 51. In some configurations, the bushing 53 may be made of a wire-mesh material and may be attached to the respective trunnion 51 by other suitable means (e.g., mechanical attachments, adhesives, etc.). Each bushing 53 may include a cylindrically-shaped central portion 54 and a peripheral portion 55 that extends around and radially outwardly from a periphery of the central portion 54. As shown in FIG. 9, the central portion 54 may be disposed within the aperture 52 of the respective trunnion 51 such that an outer cylindrical surface 57 of the central portion 54 contacts an inner cylindrical surface 58 of the aperture 52. The peripheral portion 55 may be disposed between the sidewall 48 and the second housing assembly 24 and may have an inner surface 59 that contacts an outer surface 56 of the sidewall 48. As shown in FIGS. 5-8, an anchor feature 60 may be integrally formed with the first shell 40 and may extend upwardly from the top side 46 of the first shell 40. The anchor feature 60 may also be positioned above and out of the fluid passageway 34.

The second shell 42 may have a generally semi-circular or "U" cross-sectional shape and may be attached to the first shell 40 such that the first and second shells 40, 42 cooperate to define the inlet 30, the outlet 32 and the fluid passageway 34. The first and second shells 40, 42 may also be attached (e.g., welded) to each other at a joint 61. That is, as best shown in FIG. 9, the second shell 42 may include a first end portion or edge 62 that at least partially overlaps a first end portion or edge 64 of the first shell 40 at the joint 61. The second shell 42 may also include a second end portion or edge 65 having a flange 71 that is attached to (e.g., welded) a flange 69 extending from a second end portion or edge 70 of the first shell 40 at the joint 61.

A heat shield or cover plate 72 may be made of a metallic material and may be attached (e.g., welded) to an outer surface 73 of the first shell 40 at the top side 46 thereof such that the shield 72 substantially covers the opening 44. Stated another way, a periphery of the shield 72 may be welded to the outer surface 73 of the first shell 40 at the top side 46 thereof. As shown in FIGS. 5 and 6, the shield 72 may have a valve-flap section 74, a shaft section 76 and an end section 78. The valve-flap section 74 may be planar and may have a slot 79 formed therein that receives or accommodates the anchor feature 60. An indentation 80 may be formed in the valve-flap section 74 and at least partially in the shaft section 76. The indentation 80 extends at least partially into the fluid passageway 34 (FIGS. 7 and 8) and may include an aperture 81.

The shaft section 76 may be positioned between the valve-flap section 74 and the end section 78 and may have a generally semi-circular or "U" cross-sectional shape. As shown in FIG. 9, the shaft section 76 may also be positioned between the sidewalls 48 extending upwardly from the first shell 40 and may cover or overlap a portion of the trunnions 51 and the bushings 53. The shaft section 76 may also define a cutout 82 that the valve flap assembly 26 extends through. The end section 78 may be planar and may have an aperture 84.

As shown in FIGS. 2-4 and 7-9, the second housing assembly or doghouse 24 may be disposed on the first shell 40 at the top side 46 thereof. The second housing assembly 24 may house the valve flap assembly 26, the ears 48, the trunnions 51, the bushings 53, the anchor feature 60 and the shield 72. The second housing assembly 24, the shield 72 and the upper shell 40 may cooperate to form a substantially enclosed compartment 85. The second housing assembly 24 may be sealingly engaged to the first shell 40 to prevent fluid in the fluid passageway 34 from leaking out. The second housing assembly 24 may be symmetrical about a plane A dividing the fluid passageway 34 in half (FIG. 9).

The second housing assembly 24 may include a first shell 86 and a second shell 88. The first and second shells 86, 88 may be formed by a stamping process and may be made of a metallic material (e.g., steel). The first and second shells 86, 88 may be arranged in a side by side fashion and may be attached (e.g., welded) to each other at a joint 89 (FIGS. 2 and 9) that extends a length of the second housing assembly 24. As shown in FIGS. 5 and 6, each of the first and second shells 86, 88 may include a curved flange 90 extending from a front end 92 and a curved flange 93 extending from a rear end 94. The flanges 90, 93 of the shells 86, 88 are formed for welding the shells 86, 88 to the upper shell 40, thereby creating a seal between the shells 86, 88 and the upper shell 40. The first shell 86 may include a first end portion or edge 96 of side 98 that is attached (e.g., welded) to the side 50 of the upper shell 40, thereby creating a seal between the shell 86 and the upper shell 40. Similarly, the second shell 88 may include a first end portion or edge 100 of side 102 that is attached (e.g., welded) to the other side 50 of the upper shell 40, thereby creating a seal between the shell 88 and the upper shell 40. The second shell 88 may also include a second end portion 104 that overlaps a second end portion 106 of the first shell 86 at the joint 89. Stated another way, an inner surface 108 of the second shell 88 is welded to an outer surface 110 of the first shell 86 at the joint 89, thereby creating a seal between the shells 86, 88 (FIG. 9).

The first shell 86 may include a bushing receptacle 112 integrally formed therewith at the side 98 and the second shell 88 may include a bushing receptacle 113 integrally formed therewith at the side 100 and aligned with the bushing receptacle 112. Prior to attaching the shells 86, 88 to the upper shell 40, each shell 86, 88 may be attached to (e.g., pressed onto) a respective bushing 53 such that an outer surface 114 of the peripheral portion 55 contacts a circular-shaped wall 116 of the respective bushing receptacle 112, 113 (FIG. 9). In this way, the bushings 53 may be in a heat transfer relationship with the second housing assembly 24 and may transfer heat thereto. In some configurations, the shells 86, 88 may be attached to the bushings 53 by other suitable means (e.g., mechanical attachments).

The valve flap assembly 26 may include a valve shaft 118, a spring 120 and a monolithic valve flap 122. As shown in FIG. 9, the valve shaft 118 may be housed within the second housing assembly 24 (i.e., out of the fluid passageway 34) and may extend transverse (i.e., perpendicular relative to the longitudinal direction of the first housing assembly 22) to the fluid passageway 34. The shaft section 76 of the shield 72 may accommodate the valve shaft 118 (i.e., the shaft 118 may extend through a space 123 defined by the shaft section 76). The valve shaft 118 may have an axis 124 that is positioned above the first housing assembly 22 and out of the fluid passageway 34 (FIG. 9). The valve shaft 118 and the trunnions 51 may be coaxially aligned. The valve shaft 118 may extend at least partially through openings 126 of each bushing 53 so that the bushings 53 are disposed on opposing ends 128 of the valve shaft 118, thereby rotatably supporting the valve shaft 118.

As shown in FIGS. 7 and 8, the spring 120 may be housed within the second housing assembly 24 and may extend in a longitudinal direction of the second housing assembly 24. The spring 120 may include a first connecting element 130, a coil 132 and a second connecting element 134. The first connecting element 130 may extend from an end of the coil 132 and may have a hook-shape that is engaged with the anchor feature 60 (i.e., the first connecting element 130 is disposed in an opening 138 of the anchor feature 60). The second connecting element 134 may extend from another end of the coil 132 and may also have a hook-shape that is engaged with the valve flap 122. In this way, the valve flap 122 is rotationally biased toward a first position (i.e., a closed position).

The valve flap 122 may be made of a metallic material (e.g., steel) and may extend through the cutout 82 of the shaft section 76. The valve flap 122 may be fixed for rotation with the valve shaft 118 and may be rotatable about the axis 124 of the valve shaft 118 between the first position (FIG. 8) whereat fluid is restricted from flowing through the fluid passageway 34 and a second position (FIG. 7; an open positon) whereat fluid is allowed to flow through the fluid passageway 34. The spring 120 may move between first and second states when the valve flap 122 rotates between the first and second positions. That is, the spring 120 may be in the first state when the valve flap 122 is in the first position, and may be in the second state when the valve flap 122 is in the second position. The spring 120 may be a further distance from the first housing assembly 22 (and the shield 72) when in the first state (i.e., the valve flap 122 is in the first position) then when in the second state (i.e., the valve flap 122 is in the second position). A distance between the top side 46 of the upper shell 40 and a top side 142 of the shells 86, 88 may increase from the rear end 94 of the shells 86, 88 to the front end 92 of the shells 86, 88. In this way, the movement of the spring 120 (and the valve flap 122) may be accommodated for (i.e., the spring 120 and the valve flap 122 are prevented from contacting the second housing assembly 24 at all times).

As shown in FIG. 7, when the valve flap 122 is moved to the second position, a recess or trough 144 formed by the indentation 80 of the shield 72 accommodates the coil 132 of the spring 120, the aperture 81 of the shield 72 accommodates the first connecting element 130 of the spring 120, and the aperture 84 of the shield 72 accommodates the second connecting element 134 of the spring 120. In this way, the spring 120 is prevented from contacting the shield 72, which, in turn, prevents heat transferred to the shield 72 (i.e., from the exhaust gas and the first housing assembly 22) from being transferred to the spring 120. Accordingly, the spring 120 is able to operate at cooler temperatures.

The valve flap 122 may have a plate section 146, a shaft section 148 and an arm or end section 150. With reference to FIGS. 3-8, the plate section 146 may be planar and may be disposed within the first housing assembly 22 (FIGS. 3, 4, 7 and 8). The plate section 146 may block or prevent fluid flow through the fluid passageway 34 when the valve flap 122 is the first position and may allow fluid flow through the fluid passageway 34 when the valve flap 122 is in the second position. A triangular-shaped indentation 152 may be formed in the plate section 146 and at least partially in the shaft section 148.

The shaft section 148 may be positioned between the plate section 146 and the end section 150 and may have a generally "U" cross-sectional shape. As shown in FIGS. 7 and 8, the shaft section 148 may be partially disposed within the first housing assembly 22 and partially disposed within the second housing assembly 24. The shaft section 148 may be attached (e.g., welded) to a diametrical surface 156 of the valve shaft 118 so that the valve flap 122 is rotationally fixed to the valve shaft 118. As shown in FIG. 9, the shaft section 148 of the valve flap 122 and the shaft section 76 of the shield 72 may cooperate to act as a shroud or cover to the valve shaft 118 along a length thereof. The shaft section 148 may include protrusions 157 extending outwardly from opposing ends thereof. The protrusions 157 may be configured to contact the bushings 53, thereby restricting movement of the valve shaft 118 (and the valve flap 122) in an axial direction.

As shown in FIGS. 7 and 8, the end section 150 may extend from the shaft section 148 and through the cutout 82 formed in the shaft section 76 of the shield 72. In this way, the end section 150 is positioned within the second housing assembly 24. The end section 150 may have a curve or bend therein. The end section 150 may include a first portion 158 and a second portion 160 extending at an angle $\alpha$ relative to the first portion 158. The angle $\alpha$ may be between 90 and 179 degrees. The second portion 160 of the end section 150 has an aperture 164 formed therein. The second connecting element 134 is engaged with the second portion 160 of the end section 150 (i.e., the second connecting element is disposed in the aperture 164 of the second portion 160).

When a pressure drop (differential between the inlet connecting pipe 36 and the outlet connecting pipe 38) exceeds a preload of the spring 120, the valve flap 122 moves from the first position toward the second position. By the second connecting element 134 being engaged with the second portion 160 of the end section 150 as opposed to the first portion 158 (or along a plane 163 of the first portion 158), the torque required to maintain the valve flap 122 in the second position (or move the valve flap 122 toward the second position when the valve flap 122 is moved from the first position) is reduced, which reduces backpressure.

Figure 11:
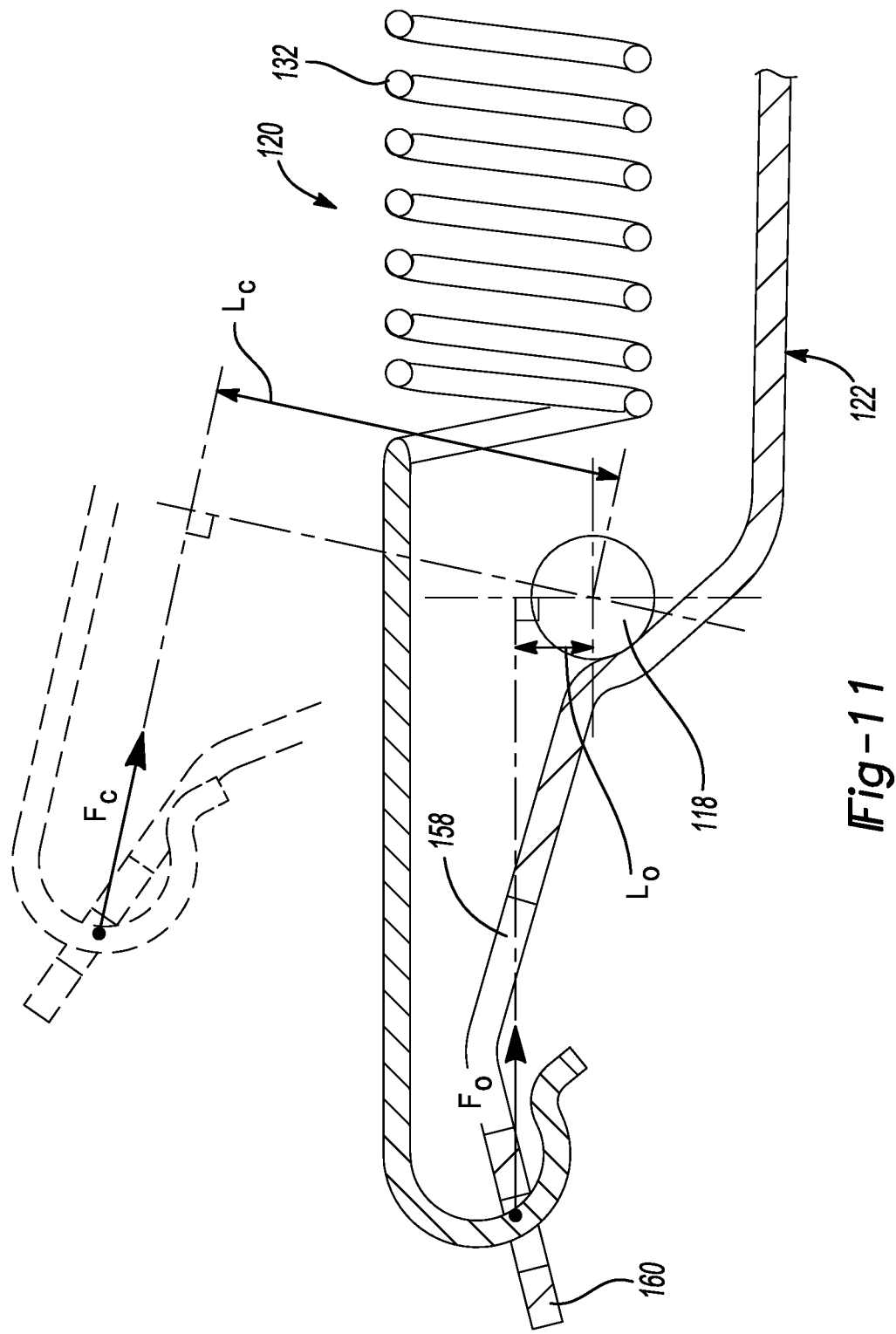
FIG. 11 is an enlarged cross-sectional view of a portion of the valve assembly with the second housing omitted and includes a free-body diagram of the force system acting on the valve flap of the valve assembly.

For example, as shown in FIG. 11, the second connecting element 134 being engaged with the second portion 160 of the end section 150 when the valve flap 122 is in the second position creates a moment arm $L_o$ (i.e., perpendicular distance between the pivot axis 124 and the force $F_o$) that is smaller than a moment arm $L_c$ (i.e., perpendicular distance between the pivot axis 124 and the force $F_c$) when the valve flap 122 is in the first position. Accordingly, the moment arm $L_o$ is minimized by moving the spring attachment point closer to pivot axis 124 when the valve flap 122 is in the second position (i.e., open position). In this way, a torque (torque$_o$=$L_o F_o$) required to maintain the valve flap 122 in the second position is smaller than a torque (torque$_c$=$L_c F_c$) required to move the valve flap 122 from the first position. It should be understood that although the spring 120 extends slightly longer in the second location than in the first location, the force $F_o$ is minimally greater than the force $F_c$ and thus the torque at both locations being impacted more by respective moments arms $L_o$, $L_c$. As depicted in FIG. 11, $L_o$ is substantially greater than $L_o$.

A generally semi-circular shaped first pad 166 may be attached to the valve flap 122 and may include a first portion 167a and a second portion 167b that is movable relative to the first portion 167a. The first portion 167a may include a first recess 175a defining a first surface 177a and the second portion 167b may include a second recess 175b defining a second surface 177b. The second portion 167b may be angled relative to the first portion 167a when the valve flap 122 is removed from the first position (FIG. 7) and may be aligned with the first portion 167a when the valve flap 122 is in the first position (FIG. 8; the first and second surfaces 177a, 177b are coplanar).

A portion of the plate section 146 is received in the first recess 175a and contacts the first surface 177a when the valve flap 122 is removed from the first position (i.e., a first surface 168 of the plate section 146 contacts the first surface 177a). A portion of the plate section 146 is received in the first and second recesses 175a, 175b and contacts the first and second surfaces 177a, 177b when the valve flap 122 is in the first position (i.e., the first surface 168 of the plate section 146 contacts the first and second surfaces 177a, 177b). A curved periphery 169 of the second portion 167b contacts an inner surface 170 of the lower shell 42 when the valve flap 122 is moved to the first position, which causes the second portion 167b to move into alignment with the first portion 167a and absorb energy of the valve flap 122 and the spring 120, thereby reducing noise generated. The curved periphery 169 may extend past or cover a curved periphery 171 of the plate section 146. The first pad 166 may be made of a deformable wire-mesh material or any other suitable material that further reduces noise as the first pad 166 contacts or engages the inner surface 170 of the lower shell 42.

As shown in FIGS. 7 and 8, a U-shaped unitary mass damper 172 may be positioned on a second surface 174 of the plate section 146 that is opposite the first surface 168. The mass damper 172 may be made of a high-density material (density≥10 g/cm³) that is able to withstand the temperature of the exhaust gas. For example, the mass damper 172 may be made of a tungsten carbide material. The mass damper 172 has a higher density then that of the valve flap 122. The mass damper 172 is formed by a molding and/or machining process. A curved periphery 173 of the mass damper 172 is aligned with the curved periphery 171 of the plate section 146 (i.e., the curved periphery of the mass damper 172 does not extend past the curved periphery of the plate section 146). The mass damper 172 and the second surface 174 may face the outlet 32 of the housing assembly 22 when the valve flap 122 is in the first position, and the first pad 166 and the first surface 168 may face the inlet 30 of the housing assembly 22 when the valve flap 122 is in the first position. When the valve flap 122 is in the first position, the mass damper 172 prevents the valve flap 122 from moving and making noises when exhaust pulsations are experienced.

The mass damper 172 may include end portions 176 and an intermediate portion 178 disposed between the end portions 176. Each end portion 176 may include an aperture 180 that is in alignment with respective apertures 181, 182 of the plate section 146 and the first pad 166, respectively. A plurality of fasteners 179 (e.g., rivets, bolts, screws) may extend through the apertures 180, 181, 182 of the end portion 176, the plate section 146 and the first pad 166, respectively, thereby attaching the first pad 166, the mass damper 172 and the valve flap 122 to each other. As shown in FIG. 5, an outer surface 184 of the first portion 167a of the first pad 166 may include annular-shaped recesses 186 formed therein and around the apertures 181. In this way, a head 187 of each fastener 179 may be received in the recess 186 (FIGS. 3 and 9) such that the head 187 is flush with the outer surface 184. This provides for less flow disruption when the valve flap 122 is in the second position.

As shown in FIGS. 4 and 6, the intermediate portion 178 of the mass damper 172 has a thickness that is thicker than a thickness of the end portions 176. The intermediate portion 178 has a groove 185 formed in a planar surface 191 thereof.

With reference to FIGS. 4, 7 and 8, a generally triangular-shaped second pad 188 may be received within a recess 190 formed by the indentation 152 in the plate section 146 and may be attached to (e.g., spot welded) the plate section 146 of the valve flap 122 via grooves 193. In this way, when the valve flap 122 is in the second position, the second pad 188 engages the indentation 80 of the shield 72 to prevent the valve flap 122 from further rotation while allowing for minimum intrusion of the valve flap 122 in the fluid passageway 34. Also, when the valve flap 122 is in the second position, the recess 190 of the mass damper 172 accommodates the indentation 80 of the shield 72, which, in turn, prevents heat transferred to the shield 72 from being transferred to the mass damper 172 (i.e., prevents the heat shield 72 from contacting the mass damper 172).

When the valve flap 122 is in the second position, the mass damper 172 (or the plate section 146 of the valve flap 122) may at least partially block the aperture 81 of the heat shield 72 and the arm 150 may at least partially block the aperture 84 of the heat shield 72. This, in turn, reduces backpressure of the apparatus 18. When the valve flap is in the first position, a portion of the exhaust gas flowing in the inlet 30 may flow through the aperture 84, the compartment 85, the aperture 81 and out the outlet 32. Stated another way, the inlet 30, the aperture 84, the compartment 85, the aperture 81 and the outlet 32 may form a bypass passageway 192 for exhaust gas flowing through the apparatus 18 when the valve flap 122 is in the first position. The second pad 188 may be made of a deformable wire-mesh material or any other suitable material that reduces noise as the second pad 188 contacts or engages the indentation 80 of the shield 72.

With continued reference to FIGS. 1-11, assembly of the valve assembly 18 will now be described. First, each bushing 53 is pressed in the respective trunnion 51. Next, the valve shaft 118 is inserted through the openings 126 of each bushing 53 so that the bushings 53 are disposed on opposing ends 128 of the valve shaft 118.

Next, the first pad 166, the second pad 188 and the mass damper 172 are attached to the valve flap 122. That is, the first pad 166 and the mass damper 172 are attached to the valve flap 122 via fasteners 179 and the second pad 188 is welded to the valve flap 122. The valve flap 122 is then welded to the valve shaft 118 and centered.

Next, the shield 72 is welded to the upper shell 40. Next, the upper shell 40 is welded to the lower shell 42. The spring 120 is then attached to the anchor feature 60 and the arm 150 of the valve flap 122. Finally, the shells 66, 68 are welded to each other and then to the upper shell 40.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve assembly for an exhaust system of a vehicle, comprising:

a housing defining an inlet, an outlet, and an exhaust gas passageway, the exhaust gas passageway extending along a longitudinal axis in fluid communication with the inlet and the outlet;

a valve flap having a first surface and an opposite second surface, the valve flap being disposed in the housing and rotatable between a first position at one extent of rotation restricting exhaust gas flow through the exhaust gas passageway, and a second position at an opposite extent of rotation whereat exhaust gas flow through the exhaust gas passageway is less restricted;

a first pad coupled to the first surface of the valve flap, the first pad being positioned between the valve flap and the housing when the valve flap is in the first position; and a mass damper disposed within the exhaust gas passageway and attached to the second surface of the valve flap, wherein the mass damper includes end portions and an intermediate portion disposed between the end portions, the intermediate portion having a thickness that is greater than a thickness of the end portions, the mass damper including an upstream portion and a downstream portion as defined when the valve flap is at the second position, a thickness of the downstream portion being greater than a thickness of the upstream portion, the mass damper being spaced apart from an inner surface of the housing when the valve flap is at the second position at the opposite extent of rotation, wherein the mass damper includes a groove aligned with the longitudinal axis, and wherein the mass damper has a curved periphery aligned with a curved periphery of the valve flap.

2. The valve assembly of claim 1, wherein the intermediate portion of the mass damper is intersected by a line that transversely passes through the exhaust gas passageway and perpendicularly intersects an axis of rotation of the valve flap.

3. The valve assembly of claim 1, wherein a fastener extends through the first pad, the valve flap, and the mass damper to interconnect each other.

4. The valve assembly of claim 1, wherein the first pad comprises a wire-mesh material.

5. The valve assembly of claim 1, wherein the mass damper faces the outlet when the valve flap is in the first position.

6. The valve assembly of claim 1, wherein the mass damper includes a curved periphery.

7. The valve assembly of claim 1, wherein the mass damper is formed by a molding process.

8. The valve assembly of claim 1, wherein the mass damper is positioned to remain spaced apart from the housing at all positions of the valve flap.

9. The valve assembly of claim 8, wherein the first pad is in direct contact with the housing when the valve flap is at the first position.

10. The valve assembly of claim 1, further comprising a second pad coupled to the second surface of the valve flap, the second pad engaging the housing to limit travel of the valve flap when at the second position.

* * * * *